May 14, 1935.　　　G. SUNDBACK　　　2,001,591

METHOD AND MACHINE FOR MAKING FASTENERS

Original Filed July 13, 1929　　13 Sheets-Sheet 1

INVENTOR.
Gideon Sundback
BY
ATTORNEY

May 14, 1935. G. SUNDBACK 2,001,591
METHOD AND MACHINE FOR MAKING FASTENERS
Original Filed July 13, 1929 13 Sheets-Sheet 2
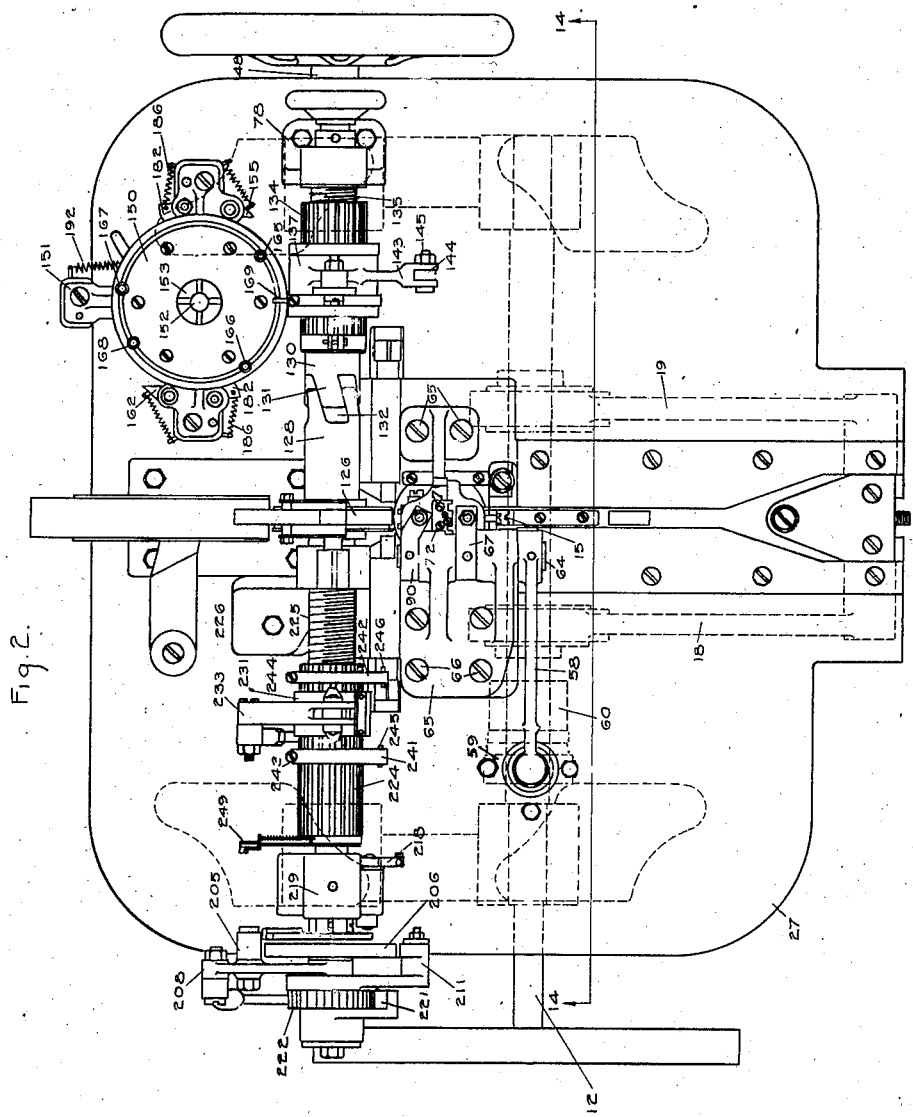
INVENTOR.
Gideon Sundback
BY
ATTORNEY

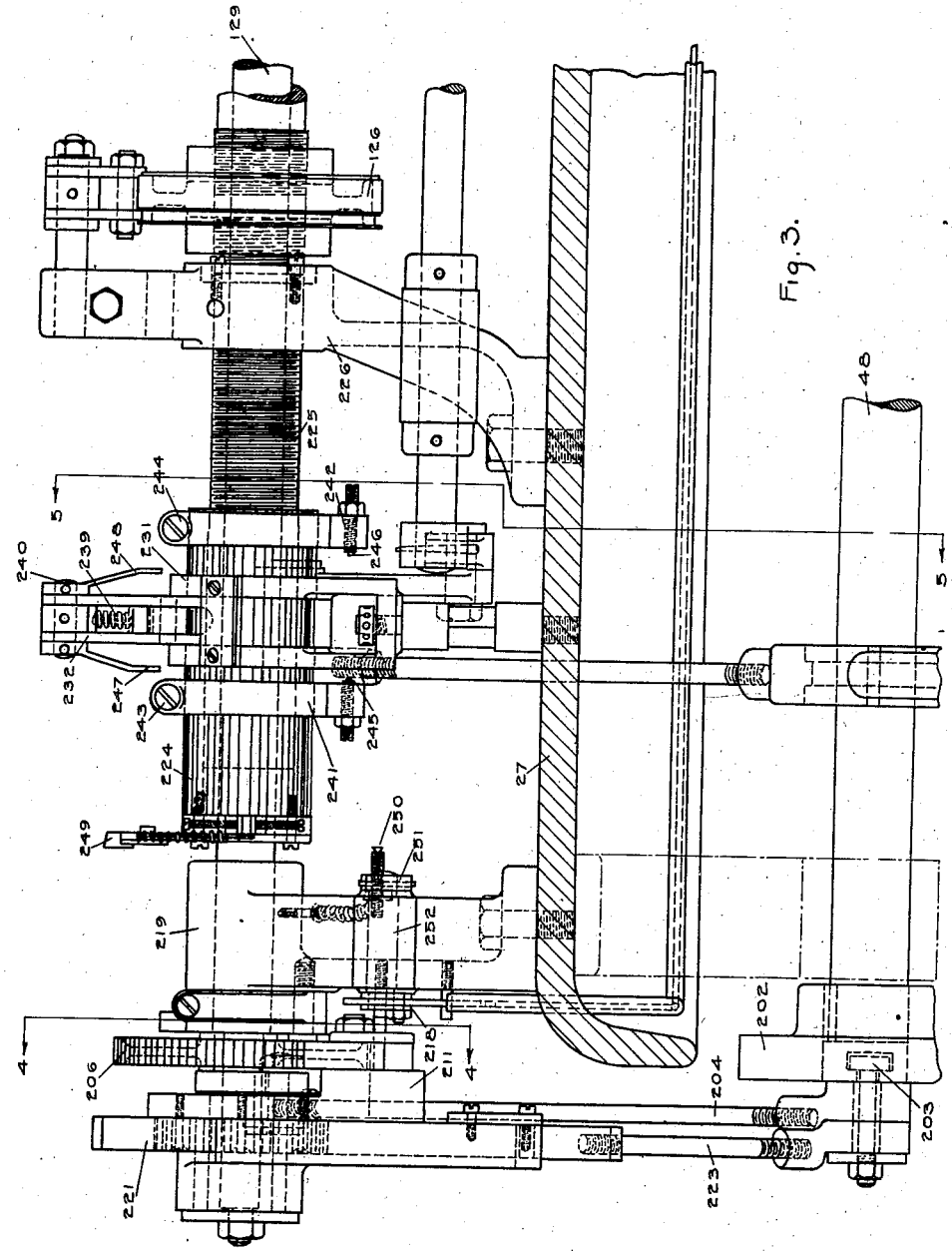

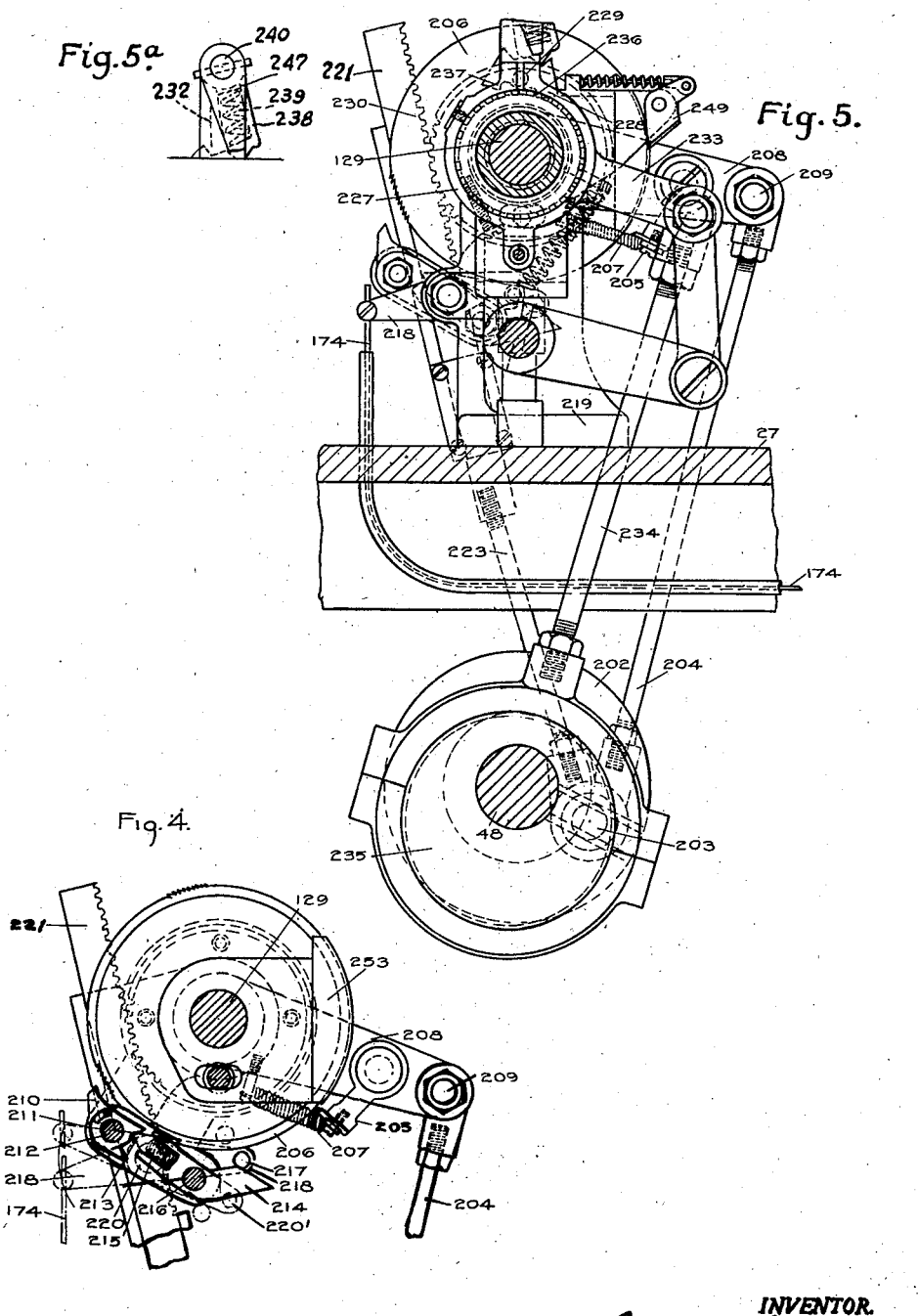

May 14, 1935.   G. SUNDBACK   2,001,591
METHOD AND MACHINE FOR MAKING FASTENERS
Original Filed July 13, 1929   13 Sheets-Sheet 5
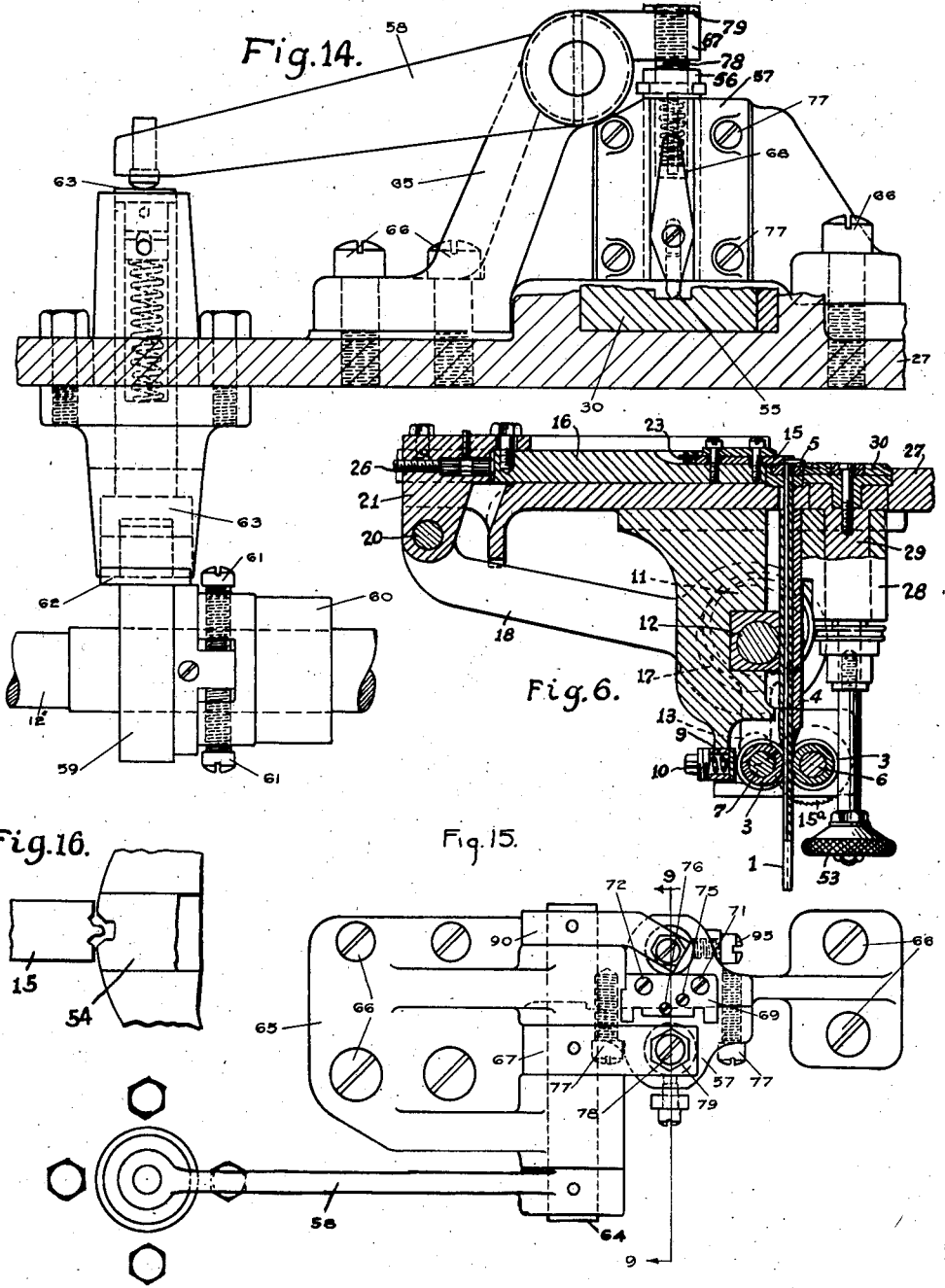
INVENTOR.
Gideon Sundback
BY
ATTORNEY May 14, 1935.　　　G. SUNDBACK　　　2,001,591
METHOD AND MACHINE FOR MAKING FASTENERS
Original Filed July 13, 1929　13 Sheets-Sheet 6
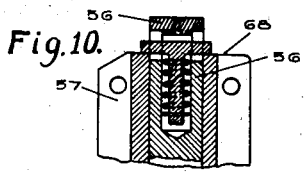
Fig.10.
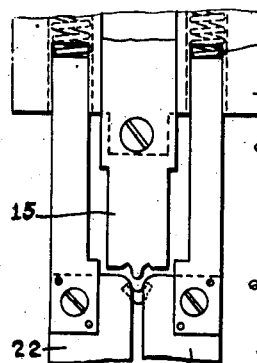
Fig.8.
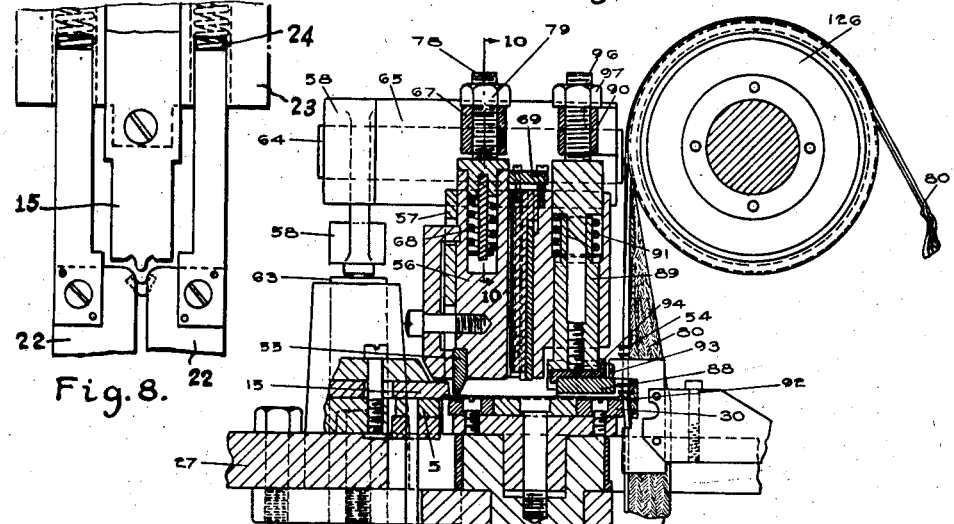
Fig.9.
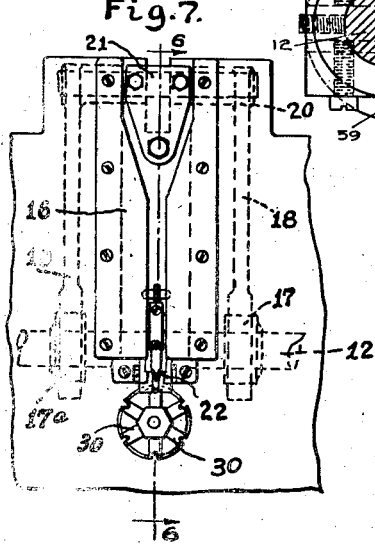
Fig.7.
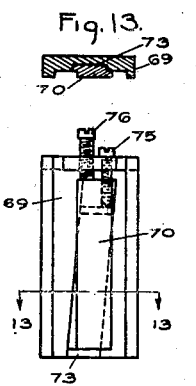
Fig.11.
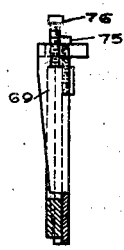
Fig.12.
Fig.13.
INVENTOR.
Gideon Sundback
BY
ATTORNEY May 14, 1935. G. SUNDBACK 2,001,591
METHOD AND MACHINE FOR MAKING FASTENERS
Original Filed July 13, 1929 13 Sheets-Sheet 7
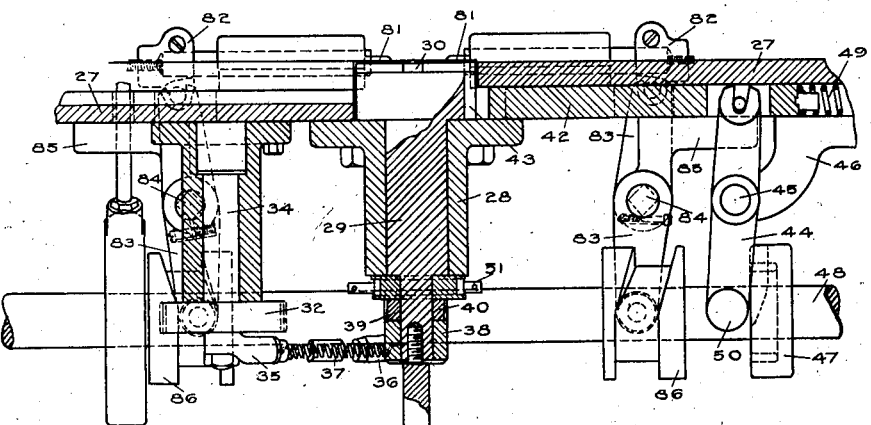

May 14, 1935.   G. SUNDBACK   2,001,591
METHOD AND MACHINE FOR MAKING FASTENERS
Original Filed July 13, 1929   13 Sheets-Sheet 8

INVENTOR.
Gideon Sundback
BY
ATTORNEY

May 14, 1935. G. SUNDBACK 2,001,591
METHOD AND MACHINE FOR MAKING FASTENERS
Original Filed July 13, 1929 13 Sheets-Sheet 9

INVENTOR.
Gideon Sundback
BY
ATTORNEY

May 14, 1935.        G. SUNDBACK            2,001,591
METHOD AND MACHINE FOR MAKING FASTENERS
Original Filed July 13, 1929    13 Sheets-Sheet 10

INVENTOR.
Gideon Sundback
BY
ATTORNEY

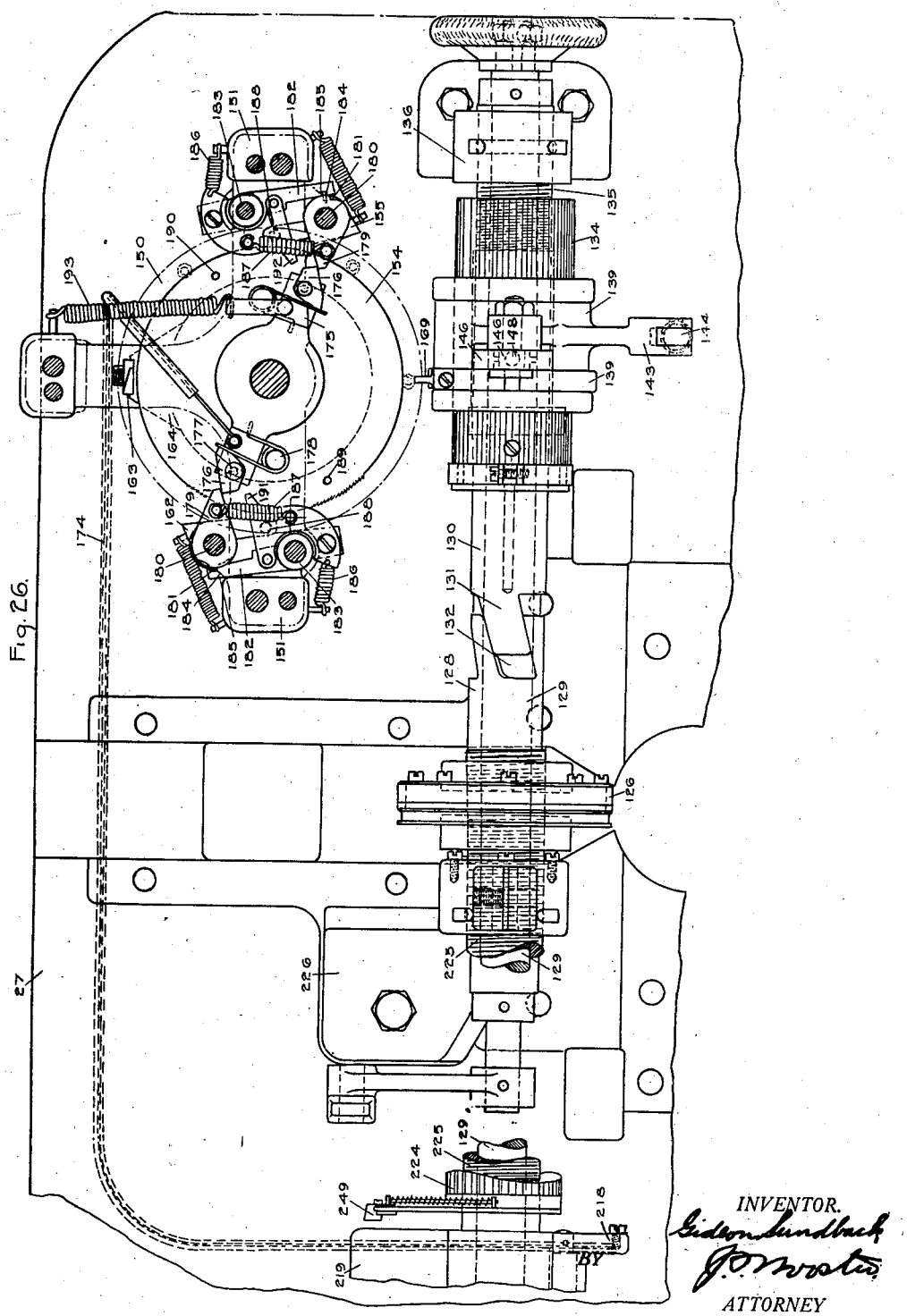

May 14, 1935.  G. SUNDBACK  2,001,591
METHOD AND MACHINE FOR MAKING FASTENERS
Original Filed July 13, 1929  13 Sheets—Sheet 12

INVENTOR.
Gideon Sundback
BY
ATTORNEY

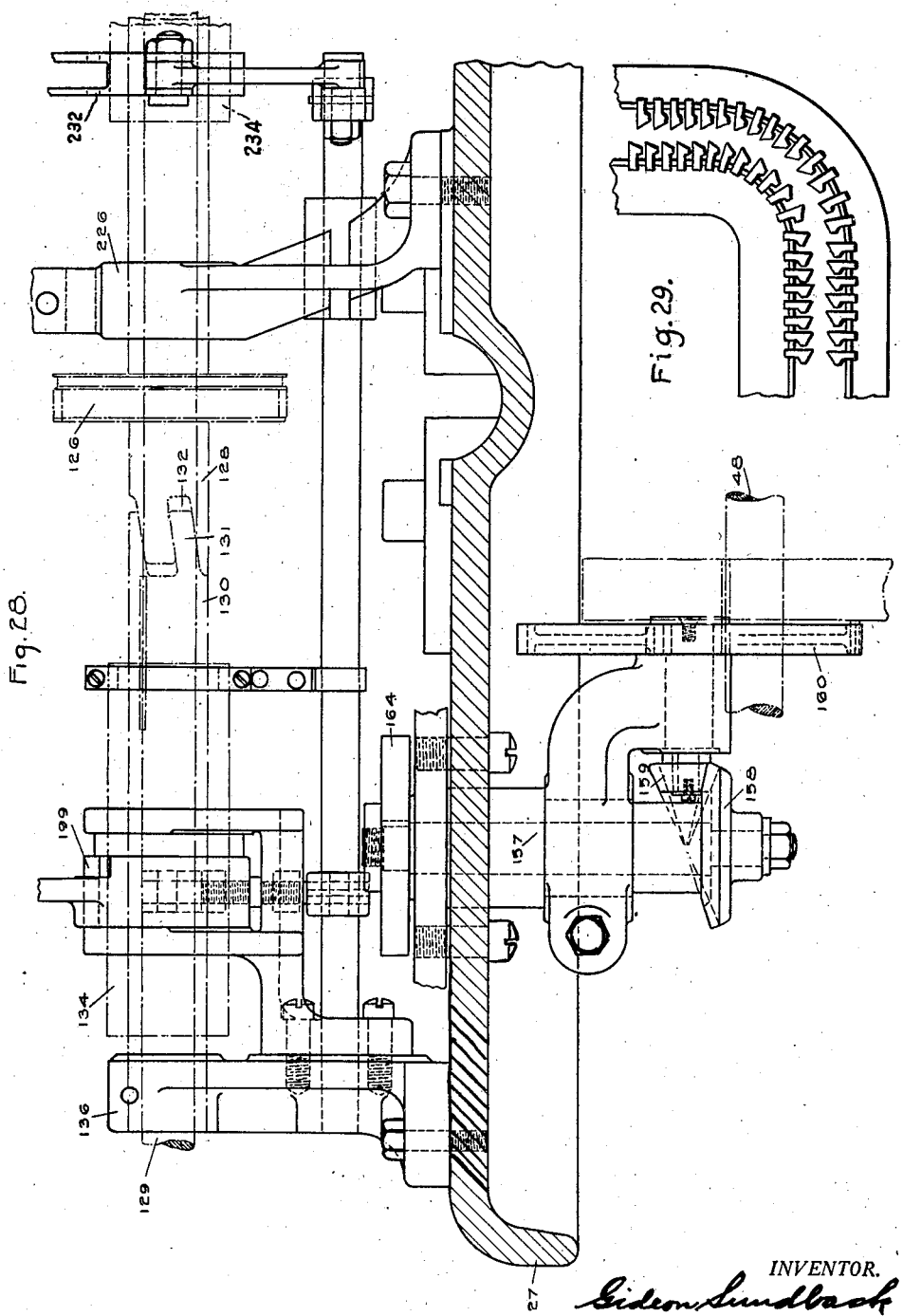

Patented May 14, 1935

2,001,591

UNITED STATES PATENT OFFICE 2,001,591

METHOD AND MACHINE FOR MAKING FASTENERS

Gideon Sundback, Meadville, Pa., assignor to Hookless Fastener Company, Meadville, Pa., a corporation of Pennsylvania Application July 13, 1929, Serial No. 378,104. Renewed March 14, 1934. In Canada February 12, 1929

44 Claims. (Cl. 113—1)

This invention relates to a machine for making fastener stringers and is an improvement upon the machines disclosed in my United States Patents #1,331,884, of Feb. 24, 1920, #1,434,857 of Nov. 7, 1922, and #1,467,015 of Sept. 4, 1923.

The machine illustrated herein is particularly adapted for forming fastener members of the type disclosed in my United States Patent #1,219,881, of March 20, 1917, and affixing them to the corded fabric tape. These fastener members have compressible clamping jaws and a recess and projection, and are arranged on a pair of stringers so as to alternately interlock through a slider mounted on both stringers.

The principal object of the invention is to provide improved means for making fastener stringers either straight or curved, or with both straight and curved portions in the same plane, and with any desired spacing between adjacent fastener members.

Other objects of the invention are to provide improved means for adjusting the punch forming the fastener members; to provide an improved tension device for feeding the tape to which the fastener members are to be attached; to provide improved means for holding the fastener members and the tape in the proper position with respect to each other while the fastener members are being clamped upon the tape; and to operate the forming, feeding and attaching mechanisms co-ordinately at a greater speed than heretofore, with a resulting increase in output and a material saving in the cost of production.

In carrying out the invention, various novel combinations and sub-combinations in the forming, feeding, tensioning and setting mechanisms are employed, all of which will be described in detail in connection with the accompanying drawings, in which;

Fig. 2 is a plan view thereof;

Fig. 3 is a side view of the tape feed movement;

Fig. 4 is a section taken along the line 4—4 of Fig. 3;

Fig. 5 is a section taken along the line 5—5 of Fig. 3, the upper portion thereof being broken away;

Fig. 5a is a view corresponding to Fig. 5 showing the upper portion of the tape feed movement;

Fig. 6 is a sectional view showing details of the cutting punch slide, and of the metal feed taken along the line 6—6 of Fig. 7;

Fig. 7 is a top view of the cutting punch slide;

Fig. 8 is an enlarged view of the cutting punch and pressure plates;

Fig. 9 is a sectional view taken on the line 9—9 of Fig. 15 showing the means for adjusting the forming punch and the tension device for holding the fastener members in position while being clamped upon the tape;

Fig. 10 is a sectional view showing details of the cutting punch slide taken along the lines 10—10 of Fig. 9;

Fig. 11 is a side view of the means for adjusting the forming punch;

Fig. 12 is a detail illustrating a portion of the adjusting means shown in Fig. 11;

Fig. 13 is a section taken on the line 13—13 of Fig. 11;

Fig. 14 is a sectional view taken on the line 14—14 of Fig. 2, showing details of the forming punch;

Fig. 15 is a plan view of the mechanisms shown in Fig. 14;

Fig. 16 is an enlarged top view showing a fastener member positioned in the forming die;

Fig. 17 is a sectional side view showing the means for revolving the forming die and the means for clamping the fastener members on the tape;

Fig. 24 is a section taken on the line 24—24 of Fig. 22;

Fig. 25 is a section taken on the line 25—25 of Fig. 24;

Fig. 26 is a plan view of a portion of the machine illustrating the mechanisms for making curved stringers;

Fig. 28 is a sectional side view of the mechanisms for making curved stringers; and Fig. 29 shows a stringer having straight and curved portions produced by different settings of the machine.

Figures 1, 1A:
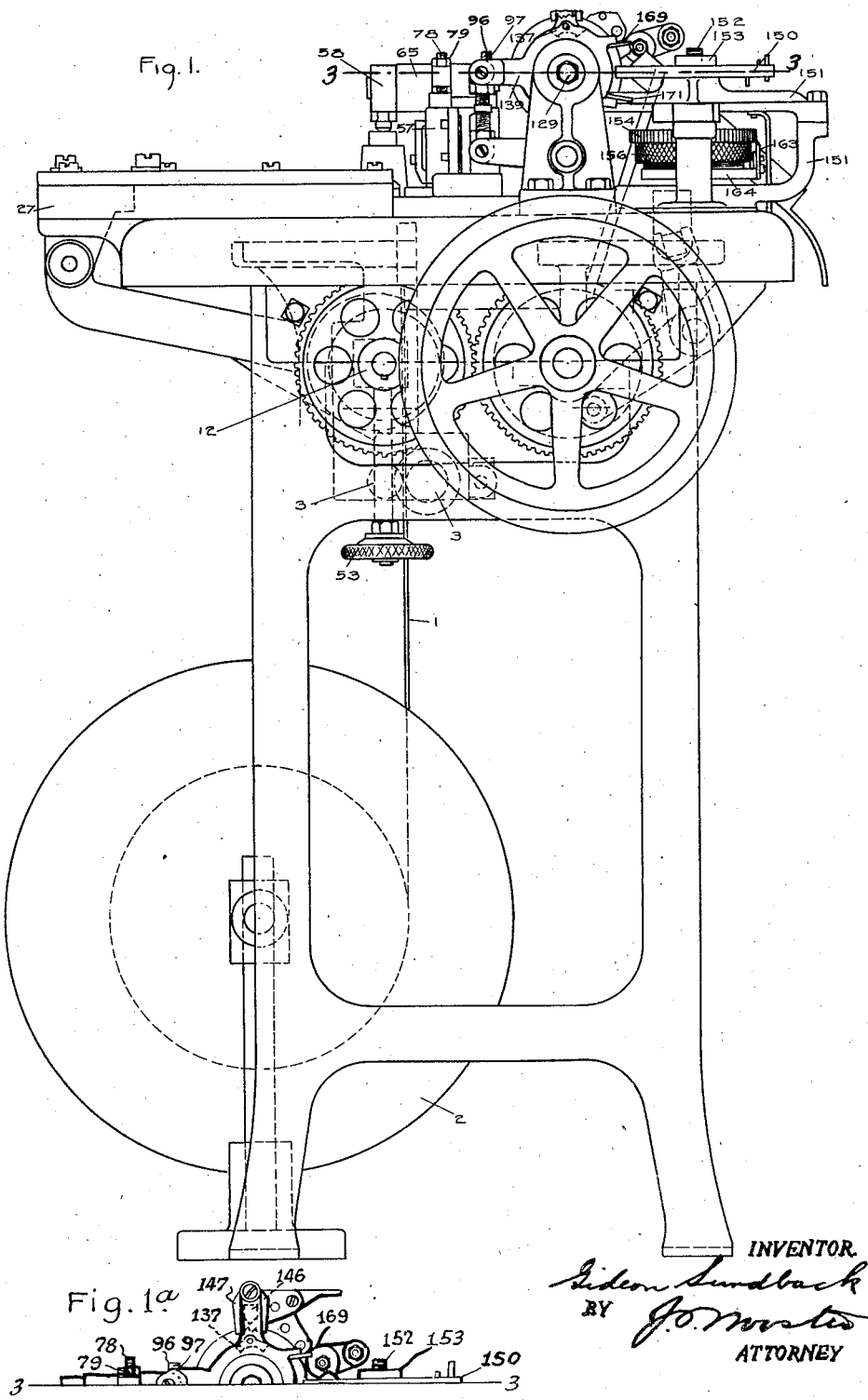
Fig. 1 is an end view of a machine embodying the invention, the upper portion thereof being broken away.
Fig. 1a is an end view of the upper portion of the machine shown in Fig. 1.
Figure 18:
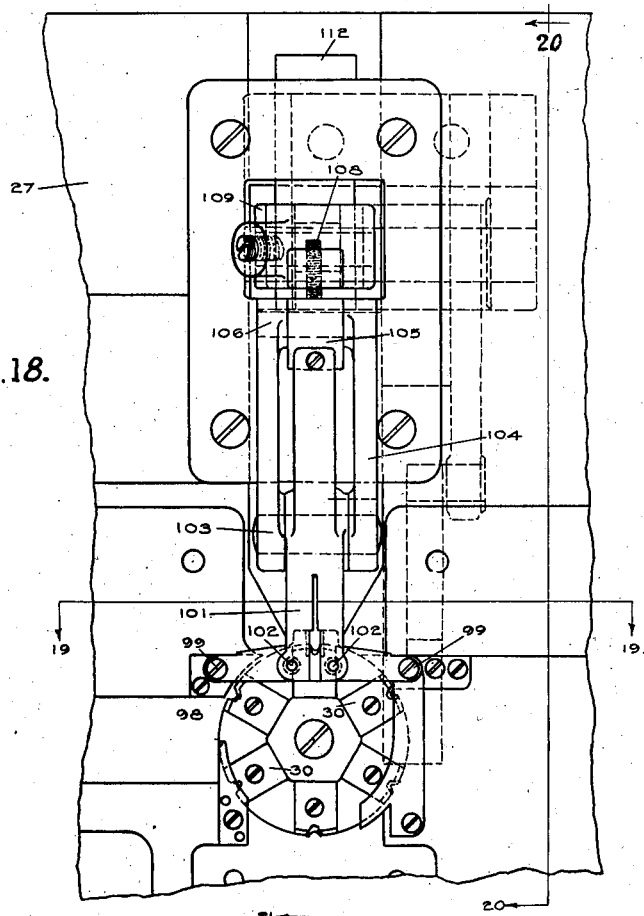
Fig. 18 is a plan view showing a modified form of the tension device illustrated in Fig. 9 for holding the fastener members in position while being clamped upon the tape.
Figure 19:
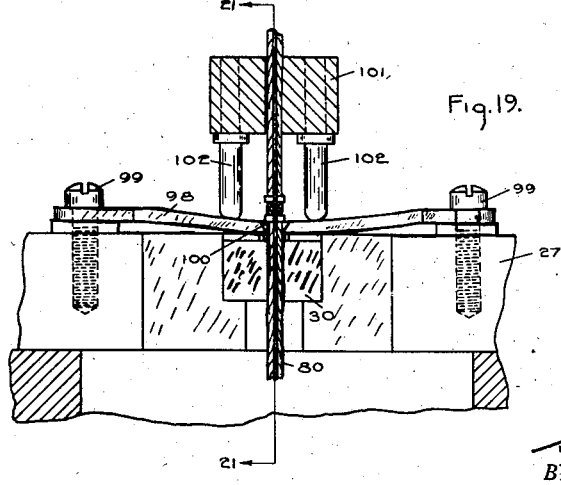
Fig. 19 is a section taken on the line 19—19 of Fig. 18.
Figure 20:
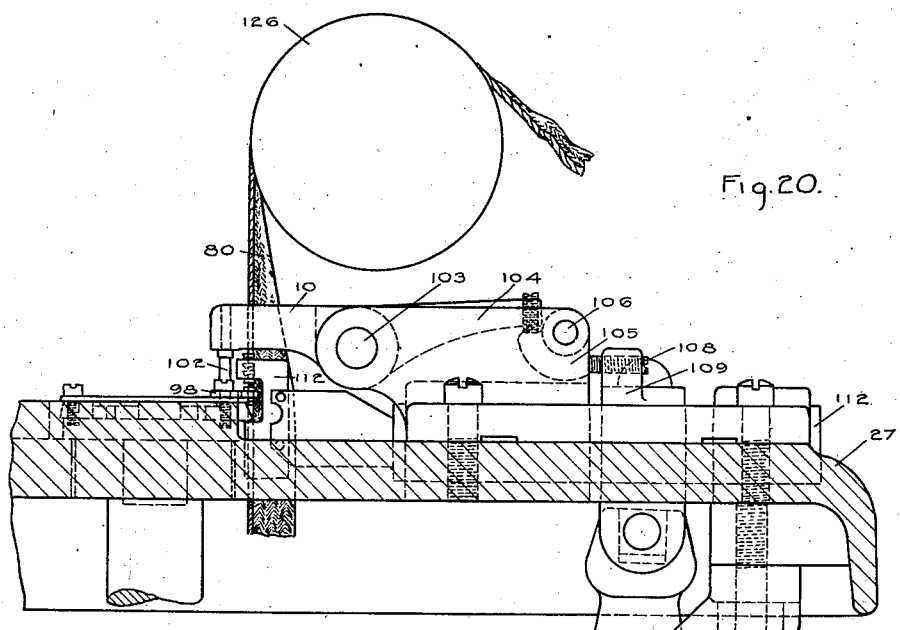
Fig. 20 is a section taken on the line 20—20 of Fig. 18.

In Figs. 1, 2, 6 and 9 of the drawings, 1 is a wire of channel shaped cross-section, usually of non-rusting alloy, and so rolled or drawn as to have the sides of the channel of such sections constitute the clamping jaws of the fastener members without any further operation thereon. This wire unwinds from reel 2, Fig. 1, and is fed step-wise by friction rolls 3 through the guide 4 and cutting die 5, Fig. 6. The rolls 3 are grooved to fit the shape of the wire and are mounted on shafts 6 and 7 and connected by gears. The friction between the rolls and the wire is adjusted by the pressure of spring 9 through the screw 10. The movement of the rolls is effected by the eccentric 11 on shaft 12 oscillating the rocker 13 pivotally mounted on shaft 6 and carrying a pawl. The latter acts on the ratchet 15a also mounted on shaft 6 and thereby effects an intermittent movement of the metal strip 1. The amount of this feed constitutes the thickness of a fastening member blank and is predetermined in proportion to the spacing of such members on the tape and to the required strength of the jaw members, and can be readily changed where desired without involving waste.

Referring to Figs. 6 and 7, a cutting or shearing knife 15 is provided with its cutting edge preferably shaped to partially conform to the blank strip 1. This knife is mounted in slide 16, on table 27, and is moved back and forth by eccentrics 17 and 17a on shaft 12 through connecting rods 18 and 19, both of which are fastened to shaft 20 rocking in bracket 21, which bracket is attached to slide 16. The strip blank 1 is so positioned relatively to the knife 15 that the latter cuts from the jaw and toward the body end so as not to distort the jaws in cutting, and also so that the jaws will be in proper relation to the tape when clamped, without requiring the blank member to be turned around, and without getting out of control. Attached to extensions of slide 16 on each side of knife 15 are spring plates 22 pivoting on 23 constituting a presser foot mechanism, and acted on by compression springs 24. The knife 15 is adjusted laterally by set screw 25, in desired proximity to plates 22, and retains its position relatively to the plates during the forward and back movements of the slide 16. The slide 16 has the adjusting screw 26.

Referring to Figs. 6, 7 and 17, revolving in the bracket 28 and table 27 is the column 29 which carries the forming dies 30. The spiral gear 32 on shaft 34, driven by a suitable gear on shaft 12, acts as a crank plate and through the terminals 35 and 36 connected by turnbuckle 37 reciprocates the rocker arm 38. The latter carries pawl 39 which acts on the ratchet 40 fastened by pins to the column 29. As the spiral gear 32 revolves the pawl 39 catching in the teeth of ratchet 40 intermittently revolves the column 29 and brings in rotation the forming dies 30 into the positions illustrated in Fig. 7.

Referring to Figs. 7, and 17, 42 is a slide mounted in the table 27 with its front end shaped to fit into a slot 43 in column 29. This slide is operated through the lever 44 mounted pivotally at 45 in bracket 46 by the single faced cam 47 revolving with shaft 48 on one hand and compression spring 49 on the other. When one of the dies 30 reaches the position shown in Fig. 16, corresponding slot 43 comes into line with the tapered end of slide 42, the spring 49 moves the slide 42 forward into slot 43 as governed by the cam 47 and thereby locks the column 29 and dies 30 in position. The lock is released when the cam 47 revolves sufficiently to withdraw the slide 42 from the slot 43 against the pressure of spring 49. The column 29 is held against the back stroke of pawl 39, or accidental movement, by brake 51. A hand wheel 53 is provided for turning the column 29 in setting or adjusting the dies 30 when the machine is not in motion.

Referring to Figs. 6, 7, and 17, while the column 29 is in motion and one of the dies 30 is approaching the position directly opposite the cutting knife 15 and die 5 shown in Figs. 7 and 8, the slide 16 starts the forward movement toward the column 29. The blank strip 1 is fed up with its end extending above the cutting die 5 by an amount equaling the peripheral travel of rolls 3 during a single movement thereof, or the thickness of a fastener member. The cutting knife 15 on its way forward now shears off the projecting end of blank strip 1 against the edge of cutting die 5. The plates 22, the operating end of which have been lifted by the blank strip 1 as it was fed up, are by action of the springs 24 holding the end of the metal strip to prevent displacement or ejection of the fastening member blank at the moment the cutting operation is completed. Likewise the plates 22 continue to hold the blank flat against the top of the cutting die as it is next fed forward toward the column 29 by further movement of cutting knife 15. As the column 29 stops, and the blank propelled by the cutting knife 15 on slide 16 nears the die 30 in the column 29, the locking slide 42 enters slot 43, Fig. 17, to lock the column and dies 30 in position.

In this manner the sheared fastener members 54 are propelled one by one into the dies 30 in position to be operated on by the forming punch 55. The punch 55 is attached to a slide 56 which is mounted in bearing 57 and receives its vertical up and down motion through lever 58. The lever 58 is operated by the action of cam 59 which in turn is driven by main shaft 12. The cam 59 is adjustable by means of sleeve 60 and adjusting screws 61. Cam 59 acts on roller 62 which is mounted in slide 63 which imparts an up and down motion to lever 58 which is keyed to shaft 64 mounted on bracket or bearing 65 which is secured to the table 27 by bolts 66. The upward motion of lever 58 imparts a corresponding downward motion to arm 67 of lever 58, which gives slide 56 its downward thrust, causing the forming punch 55 to give the fastener member 54 the desired form with a recess on one side and a projection on the opposite side. The slide 56 is returned to its upward position by the action of compression spring 68 mounted within the slide (Fig. 10).

In order to enable the forming punch 55 to be adjusted both laterally and transversely, I provide two key members 69 and 70 which are suitably mounted in the bracket 65 and abutting against bearing 57. Key member 69 is adjusted by means of screws 71 and 72, Fig. 15, screw 71 being for the purpose of downward adjustment and screw 72 being for the purpose of upward adjustment. The member 69 is wedge-shaped in cross section, as illustrated in Fig. 12, and when adjusted downwardly tends to force bearing 57 outwardly which imparts the lateral movement to the forming punch either toward the top or bottom of the sheet in Fig. 15. Screws 71 and 72 accomplish this upward and downward motion of the key member 69 by abutment against bracket 65.

The second key member 70 is slidably mounted in a slot 73 in the key member 69. The slot 73 is angled as shown in Fig. 11. By reference to Fig. 13 it will be seen that a part of the wedge 70 projects outwardly, when viewed in cross section, overlapping the surface of the member 69 and rising above the surface of the angled portion of key member 70 which rides in the slot 73. This outwardly projecting portion of member 70 is arranged with its edges parallel to the side edges of member 69. The member 70 is adjusted upwardly and downwardly by action of screws 75 and 76 respectively. It will be seen that the adjustment vertically of key member 70 within key member 69 will, by reason of the angled portion of member 70, which rides in the slot 73, cause a transverse adjustment of key member 69 which carries the bearing 57, the outwardly projecting portion of member 70 being adapted to ride in a corresponding slot in bearing 57 which is secured to bracket 65 by means of screws 77, as shown in Fig. 15. It will thus be seen that the transverse movement of the key member 69, either toward the right or left in Fig. 15, caused by the vertical movement of member 70 will impart transverse movement to forming punch 55. Vertical adjustment of the forming punch 55 is provided for by means of adjusting screws 78 and lock nut 79 mounted thereon.

As the fastener member blank 54 moves into the forming die the forming punch 55 starts on its downward stroke and while the fastener member is held in position and confined on all sides by the cutting knife 15, plates 22 and the forming die 30 the forming of the recess and projection of the member is completed. Upon the upward stroke of the punch 55 the locking slide 42 withdraws from the slot 43 and slide 16 draws back the plates 22 and cutting punch 15. The fastener member stays in the die 30, which is now free to move with the column 29 as it starts its rotary movement in a counter-clockwise direction as viewed in Fig. 7. When the slide 16 reaches its extreme outer position with the cutting knife 15 returned to its initial position, Fig. 8, the rolls 3 feed the blank strip 1, whereupon the operations are completed.

The fastener members 54, thus formed, are carried in the dies 30 by the revolving column 29, and as the die stops diametrically opposite the place where the fastener member was placed in the die, the jaws of the fastener member are clamped around the corded edge of the tape 80 which is fed upward parallel to the blank strip 1. As shown in Fig. 17, the two clamping tools 81 are connected with and operated through clamps 82, levers 83 which pivot on the shaft 84 in brackets 85, and double faced cams 86. The latter are keyed to shaft 48. The clamping tools 81 press the jaws of the fastener member together on the corded edge portion of tape 80.

It is necessary that the members 54 be securely held in position in the forming die while being clinched on the tape. In order to ensure that the members 54 be. so held in position I provide tension punch 88 which is adapted to press upon the member 54 while it is held in the forming die 30. The tension punch 88 is mounted in slide 89 which is mounted in bracket 65, and receives its downward vertical motion through arm 90 which is keyed to shaft 64, and its upward motion through compression spring 91. Tension punch 88 has a downwardly projecting portion 92 of the same size and form as is carried by forming punch 55, which downwardly projecting portion is adapted to seat itself within the pocket formed by forming punch 55 in the fastener member 54 thus securing the fastener member 54 in proper position for clamping on the tape.

It is understood that the downwardly projecting portion 92 of tension punch 88 may be omitted and that the invention disclosed herein is adapted to be operated by pressure of the flat under surface of punch 88 abutting against the fastener member 54, thus holding it frictionally engaged against movement within the forming die 30.

In order to provide for adjustment of the tension punch 88 in a lateral direction, I provide two adjusting screws 93 and adjusting slide 94. No adjustment for the tension punch is necessary in transverse direction but sufficient play is permitted between slide 89 and key 95 which is inserted in bearing 65 to prevent the slide 89 from twisting or swinging, thus allowing the depending portion of tension punch 88 to find its proper position in the formed portion of the fastener member 54. Tension punch 88 is adjusted vertically by means of adjusting screw 96 and lock nut 97.

Figure 21:
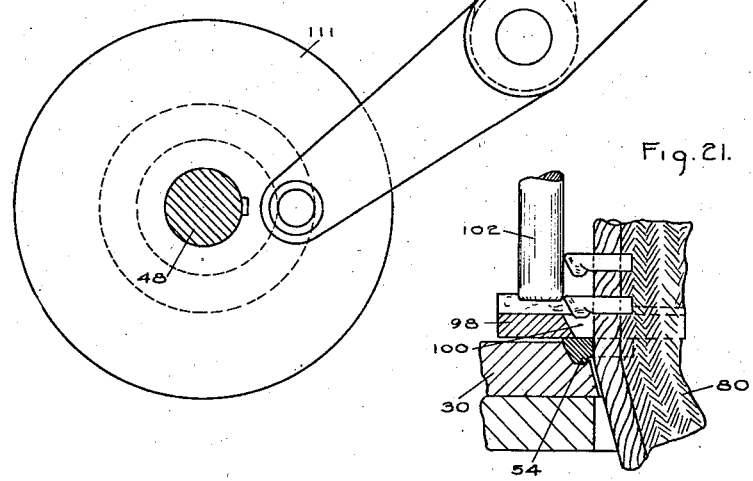
Fig. 21 is a section taken on the line 21—21 of Fig. 19.
Figure 22:
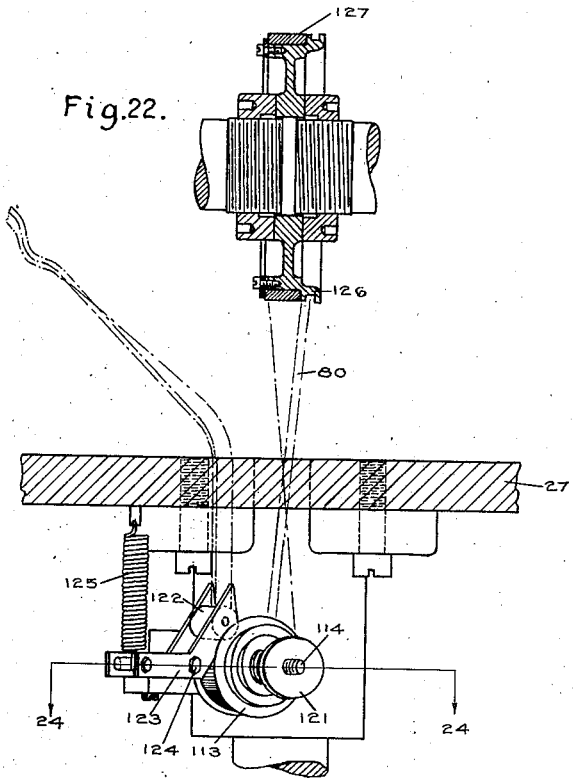
Fig. 22 is a detail view of the tape tension device and feed roll for feeding the tape.

As an alternative method of holding the fastener members in the forming dies 30 in the position where they are ready to be clamped upon the tape, I provide the devices illustrated in Figs. 18 to 21, inclusive. In Fig. 21, it will be seen that the fastener member 54 is positioned in the forming die 30 ready for engagement of its jaw portions around the corded edge of fabric tape 80. In order to hold the member 54 securely in the forming die 30, I provide tension plate 98, Fig. 19, of spring metal. This plate is mounted on table 27 by means of screws 99. Tension plate 98 is formed with recessed portion 100 to allow the corded edge tape to enter into the jaw portions of the fastener members 54. In order to exert a downward pressure on plate 98, I provide a lever 101 with prongs 102 adapted to ride on plate 98. Lever 101 is pivoted on shaft 103 which is held in bearing 104. Lever 101 receives its up and down motion through member 105 which is pivoted on shaft 106 which is mounted on bearing 104. Screw 108 is mounted on clamp 109 which has a reciprocating motion imparted by lever 110 and cam 111. Clamp 109 is mounted on slide 112 which also has a reciprocating motion for the purpose of forcing the corded edge fabric tape into engagement with the jaw portions of the fastener members 54. When reciprocating clamp 109 bearing the screw 108 is moved forwardly, screw 108 imparts a forward and upward motion to member 105 which in turn imparts an upward motion to the right-hand end of lever 101, as viewed in Fig. 20, causing prongs 102 to exert a downward pressure on tension plate 98. It is to be understood that the downward pressure of prongs 102 is synchronized to accord with the position of the fastener member 54 and forming die 30 at the point where the fastener member is adapted to be clamped upon the tape, so that plate 98 will be pressed down against each fastener member 54 at the time of clamping to the tape.

Straight fastener stringers are made by the action of the devices shown in Figs. 2, 3, 4, 5 and 26. Referring to Fig. 3, 48 is the main drive shaft on which is mounted crank plate 202 which carries crank pin 203, which is mounted in a T slot and is adjustable radially of the main shaft 48. On crank pin 203 is suitably mounted connecting rod 204 Lever 208 is pivotally connected to connecting rod 204 at 209, Fig. 4. Lever 208 at its other end is mounted on shaft 129. Lever 208 carries substantially intermediate of its length pawl 205 which is adapted to engage in teeth of ratchet 206 and is held in engagement therewith by tension spring 207. Ratchet 206 is adapted to rotate with fixed relation to shaft 129 by the action of main drive shaft 48. Connecting rod 204 is eccentrically mounted on crank plate 202 as shown in Fig. 5. As the main shaft 48 revolves it will thus be seen that lever 208 receives an up and down motion through the action of connecting rod 204, which by the action of pawl 205 on ratchet 206 imparts a step-by-step motion to the ratchet 206, thereby rotating the shaft 129 step-by-step. Referring to Fig. 26, the feed roll 126 is threaded upon sleeve 128 and sleeve 128 is freely rotatable upon shaft 129. The sleeve 130 is mounted on shaft 129 so that it can slide longitudinally on shaft 129, but cannot rotate with respect to shaft 129. Hence the step-by-step rotation of shaft 129 is imparted to sleeve 130 and is thence imparted by helical projections 131 and slots 132 to sleeve 128 and therefore to feed roll 126. Thus it will be seen that feed roll 126 receives the same step-by-step motion as imparted to ratchet 206 by feed pawl 205, thereby providing for the spacing of the fastener members 54 on the tape.

In order to allow of the manufacture of fastener stringers of varying lengths with no more than the requisite number of fastener members thereon, and to allow for a spacing of tape without fastener members thereon in between said predetermined lengths, I provide trip mechanism whereby the tape feed roll 126 will receive a quick clockwise movement to provide for the extra tape feed which produces the blank length of tape between two groups of fastener members. Referring to Figs. 3, 4 and 5, I provide pawl 210 which is pivotally mounted on bracket 211 at 212, which bracket is mounted on shaft 129. Pawl 210 is adapted to engage in teeth of ratchet 206 or to remain out of engagement as shown in Fig. 4. The tripping motion which imparts the quick clockwise movement to ratchet 206 is accomplished by pawl 210 being set in engagement with teeth of ratchet 206 by means of plunger 213 being thrust from its position as illustrated in Fig. 4, to the opposite position of the two notches shown at the rear end of pawl 210. Plunger 213 is slidably mounted on lever 214 and is held in contact with the notches of pawl 120 by compression spring 215. Lever 214 is pivotally mounted in bracket 211 at 216. An upward or downward thrust on the end of lever 214 will throw plunger 213 into the lower or upper notches respectively of pawl 210, thereby respectively causing pawl 210 to come into or out of engagement with ratchet 206. In order to provide for the engagement of pawl 210 as described I provide pin 217 mounted on lever 218 which is in turn mounted in the main bracket 219 at 220. If pin 217 carried by lever 218 is carried to the position shown at 220' (Fig. 4) and the under side of lever 214 rides thereover, it will be seen that plunger 213 will contact with the lower notch in pawl 210 thereby causing pawl 210 to engage in teeth of ratchet 206. Conversely, the raising of pin 217 allows the upper side of lever 214 to ride on pin 217 thus disengaging the pawl 210 from the teeth of ratchet 206. Bracket 211 receives a forward and reverse swinging motion through rack 221 and gear 222 which is mounted on bracket 211, rack 221 being connected by connecting rod 223 to the crank pin 203.

In order to provide for fastener stringers of predetermined length I provide drum 224 which is threaded to sleeve 225 fixedly mounted in bracket 226. Drum 224 is provided with teeth 227 in which is adapted to engage pawl 228, which is pivotally mounted at 229 to bracket 230. Bracket 230 is mounted on drum 224 and is held from axial movement by bracket 231, and is provided with two arms 232 and 233. Bracket 230 receives a rocking motion through the action of a connecting rod 234 and eccentric 235. Pawl 228 which is mounted on arm 232 of bracket 230 is provided with two teeth 236 and 237 which when in engagement with teeth 227 of drum 224 will impart thereto a contra-clockwise and clockwise motion respectively. The positioning for such movement of the drum 224 of the pawl 228 is provided by plunger 238 pivotally mounted on arm 232 on pin 240. Plunger 238 is held in engagement with notches in pawl 228 by compression spring 239.

Referring to Fig. 3, I provide clamps 241 and 242 detachably connected to drum 224 by means of screws 243 and 244. Tripping screws 245 and 246 are carried by clamps 241 and 242 respectively and are suitably adjustable. As drum 224 revolves in a stepwise movement, tripping screw 245 will come into contact with trip lever 247, which is attached to pin 240. Pawl 228 will thereupon be thrown into reverse engagement with teeth 227 of drum 224 imparting to drum 224 a reverse movement until it moves along threaded sleeve 225 and permits trip screw 246 to strike against trip lever 248 whereupon the movement of drum 224 is once more reversed.

When drum 224 is moved along sleeve 225 to its farthest position at approximately the time trip screw 246 strikes trip lever 248, trip shoe 249 carried by drum 224 contacts with tripping screw 250, which is mounted on lever 251 pivotally attached to shaft 252. When tripping screw 250 is depressed, trip lever 218 carrying trip pin 217 is likewise depressed through the action of lever 251 and shaft 252, thus allowing lever 214 to ride over trip pin 217 as in position 220' (Fig. 4). Pawl 210 is thereupon thrown into engagement with ratchet 206 and the swift movement is imparted to ratchet 206 necessary to provide for the blanking spacing of tape between the separate lengths of fastener members. As soon as trip shoe 249 has depressed and passed over trip screw 250, lever 218 will swing back to its original position shown in Fig. 4, whereupon lever 214 carried by bracket 211 will on its downward movement ride under said pin 217 throwing pawl 210 out of engagement with ratchet 206.

In order to provide for varying distances of blank tape between the stringers of fastener members, it is only necessary to provide a greater eccentricity by means of crank pin 203 thereby imparting a greater movement to rack 221, thereby providing for bracket 211 being carried on a greater arc around ratchet 206. In order, however, that such adjustment shall not interfere with the regular spacing of the fastener members I provide pawl skid 253 positioned around part of the periphery of ratchet 206 and suitably attached to brackets and extending sufficiently far above the periphery of ratchet 206 to prevent pawl 205 engaging with teeth of ratchet 206, during the rocking motion imparted to it by arm 208.

In order to provide for varying lengths of fastener stringers I provide for clamp 241 being adjustable longitudinally of drum 224 by means of adjusting screw 243. As clamp 241 is moved away from or toward clamp 242 fastener stringers will be longer or shorter respectively. Stringers of varying predetermined length can therefore be easily provided for.

Trip means 174 operating on trip swivel 175 for curved fasteners is attached to lever 218, thus synchronizing the quick forward movement of both straight and curved fastener portions to provide for the blank spacing of tape between the predetermined lengths of fastener stringers.

In order to ensure an even tension on the tape 80 and consequently even spacing of the fastener members when they are clamped on the tape, I provide the devices set out in Figs. 22 to 25. The idler drum on roll 113 is revolubly mounted on shaft 114 which is mounted in fixed relation to bracket 115. Friction members 116 and 117 are frictionally engaged in each side of the roll 113 and are mounted in fixed relation to shaft 114. The member 117 is held in fixed relation to bracket 115 by means of shaft 114 the shoulder 118 of which exerts an inward pressure to hold the member 117 in close fixed abutment against bracket 115. Shaft 114 at its intermediate portion is square in cross section, as shown in Fig. 25. The member 116 has an aperture which corresponds to the form of shaft 114 and is slipped over the said shaft in close relation thereto which allows member 116 to slide longitudinally of shaft 114. Friction rings 119 are of any suitable material such, for example, as leather, and are mounted on members 116 and 117 and held in frictional engagement against the interior surface of roll 113.

In order to adjust the frictional relation of members 116 and 117 to roll 113 for the purpose of imparting the desired drag or amount of tension on the movement of roll 113, I provide compression spring 120 which is disposed on shaft 114 and abuts against member 116 at one end, being held in place at its opposite end by adjusting nut 121.

Figure 23:
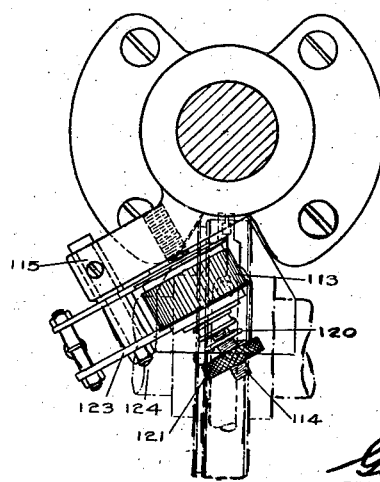
Fig. 23 is a plan view of the tape tension device shown in Fig. 22.

In order to provide against the tape 80 slipping on the periphery of roll 113, I provide that the surface of the periphery of roll 113 is knurled or otherwise given a rough gripping surface as shown in Fig. 23. In the same manner any suitable material such as rubber, which would exert a frictional engagement between the periphery of the roll and the tape would be suitable for the purpose disclosed. I hold tape 80 in close frictional engagement with the periphery of roll 113 by providing a second roll 122 which is adapted to exert a downward pressure on the tape 80 as it passes over roll 113 and holds it in close frictional relation thereto. Roll 122 is mounted in any suitable manner for such purpose, but I prefer the construction illustrated in Fig. 22 whereby the roll 122 is mounted in bracket 123 attached to bracket 115 through pivoting point or shaft 124. I provide a tension spring 125 suspended between the free end of bracket 124 and table 27 in order to force the roll 122 down against the roll 113.

After the fastener members are clamped on tape 80 the tape passes over feed roll or drum 126. Heretofore it has been the custom to make the surface of the periphery of roll 126 knurled in order to ensure tape 80 against slipping thereon. In practice, however, it has been found that the knurling on the periphery of roll 126 becomes worn and consequently allows the tape to slip, thereby occasioning an irregular feed of the tape 80 in the clamping jaw of the slide 112. This irregular feed has the effect of spacing the fastener members 54 irregularly on the tape. To obviate this slipping of the tape on roll 126, I provide a rubber insertion 127 around the periphery of roll 126 which effectually prevents slipping of the tape.

As previously stated, the machine herein shown and described is adapted for the making of straight fastener stringers as well as fastener stringers having curves therein. By the arrangement of devices which I provide I can make fasteners either straight, curved, or having a combination of straight and curved portions in the same horizontal plane. When it is desired to effectuate a curve in a fastener this is provided for by the fastener members on the outside or concave portion of a curve being spaced farther apart than those on the inside or convex portion, as shown in Fig. 29. This different spacing of the members on the stringers is effected by means of the devices illustrated in Figs. 26, 27 and 28 of the drawings.

In Fig. 26 the feed roll 126 is mounted on sleeve 128 which is rotatably mounted on shaft 129. Therefore, the feed roll or drum 126 may rotate freely with relation to shaft 129. In order to impart movement to sleeve 128 and consequently to roll 126, I provide sleeve 130 which is mounted on shaft 129 and is capable of longitudinal but not of rotatable movement with relation to shaft 129. I provide helical projections 131 on sleeve 130 adapted to slide within the helical slots 132. It will be seen that if sleeve 130 on shaft 129 is longitudinally moved toward feed roll 126 step-wise, a rotatable movement is imparted to sleeve 128 and consequently to roll 126, in addition to the normal rotation imparted to roll 126 by shaft 129. By this means the spacing between the fastener members as they are clamped on the tape is increased in order to provide for the outside or concave portion of a curved fastener stringer. When sleeve 130 is held stationary with relation to sleeve 128 the ordinary spacing is obtained which makes a straight stringer. When sleeve 130 is longitudinally moved away from feed roll 126 there occurs a reversal of the movement imparted to roll 126, to that which occurs when sleeve 130 is longitudinally moved toward the roll. By this means roll 126 receives a lesser axial movement than is imparted by the ordinary feed mechanisms employed in making straight stringers. In this way, the spacing between the fastener members on the tape is made less than in the case of a straight stringer, thereby providing for the inside or convex portion of a curve.

Drum 134 is rotatably mounted on sleeve 130 and is so arranged that sleeve 130 moves longitudinally with the drum 134. Drum 134 is threaded on sleeve 135 which is fixedly mounted on bracket 136 which in turn is mounted on table 27. When drum 134 is given rotating motion it moves longitudinally on threaded sleeve 135, thus imparting longitudinal movement to sleeve 130. The rotatable movement of drum 134 is imparted by the action of pawl 137 which is adapted to engage in teeth 138 of drum 134.

Pawl 137 is mounted on yoke 139 by pin 140. Pawl 137 has two points of engagement 141 and 142 for forward and reverse movement of drum 134, as hereinafter explained. Yoke 139 receives a reciprocating motion by the action of arm 143 to which arm 144 is pivotally mounted at 145. Arm 144 receives a reciprocating motion from the main drive shaft by any suitable attaching means. The engagement of teeth 141 and 142 of pawl 137 in teeth 138 of drum 134 is adapted to impart a forward or reverse movement respectively to sleeve 130.

In order to hold pawl 137 in engagement with teeth 138 of drum 134, whether in forward, reverse or neutral position, as may be desired, I provide plunger 146 which slides in slide bracket 147 and is adapted to be held in engagement with pawl 137 by compression spring 148. Slide bracket 147 is pivotally mounted at 149 to yoke 139. The operation of plunger 146 tripping pawl 137 for forward, neutral, or reverse position will be hereinafter explained.

Figure 27:
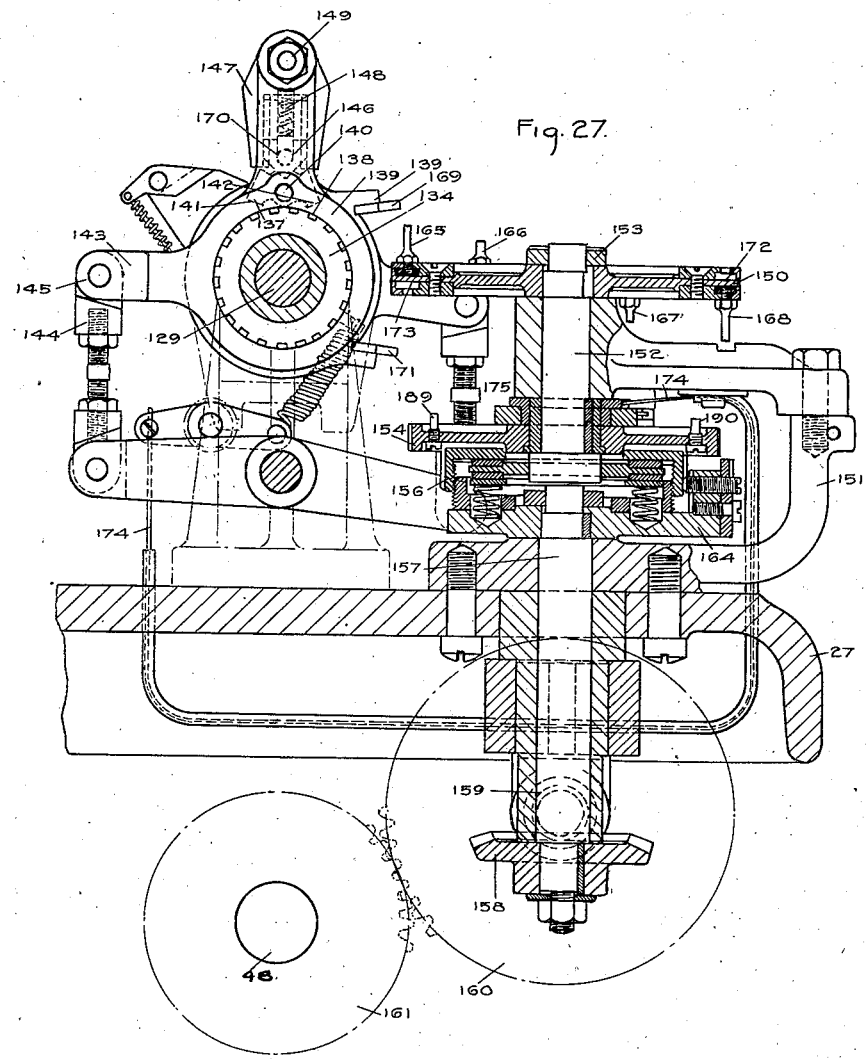
Fig. 27 is a sectional end view showing details of the mechanisms for making curved stringers.

In order to provide for the necessary spacing of fastener members on the tape in order to form stringers having both straight and curved portions therein, I provide a novel mechanism illustrated particularly in Figs. 26 and 27. To provide for the predetermined spacing and arrangement of fastener members I provide means whereby the hereinbefore described action of sleeve 130 through drum 134 may be accomplished and at the same time whereby at predetermined positions all operation of sleeve 130 and drum 134 may cease in order to permit the standard or ordinary spacing of members for straight fastener stringers to be accomplished. To accomplish this, I provide a revoluble table 150 which is mounted on bracket 151 by means of shaft 152 and nut 153. Table 150 rotates stepwise in a clockwise direction receiving its motion by means of ratchet 154 which, in turn, receives its motion from friction clutch 156 which is connected direct to the main shaft 48 by shaft 157 and gears 158, 159, 160 and 161. The pawl 155 is adapted to engage in teeth of ratchet 154 in order to prevent its movement through the action of friction clutch 156 and drive shaft 157. Oppositely disposed to pawl 155 with relation to table 150, I provide a second pawl 162 which is also adapted to engage in teeth of ratchet 154. It is to be understood that only one of the holding pawls 155 and 162 are engaged at any time in the teeth or ratchet 154 to limit rotatable movement, the other of the said pawls riding halfway between the teeth. It will readily be seen that if the holding pawl is released out of engagement with teeth of ratchet 154, ratchet 154 will rotate only the distance of one half tooth until the opposing pawl comes into engagement.

In order to release the holding pawl 155 or 162 as the case may be from teeth of ratchet 154, I provide cam section 163 which is mounted on bracket 164 and keyed to shaft 157 and rotates at fixed speed with shaft 157, as shown in Fig. 27. It will thus be seen that table 150 is given a step-by-step clockwise rotating movement.

On the top of table 150 close to the periphery are mounted a series of pins 165 and 166. Likewise, disposed on the underside of table 150 are a series of pins 167 and 168, whose object is to provide for the spacing of fastener members on the tape for straight and curved portions as will hereafter be explained. The purpose of pins 165, 166, 167 and 168 is to act as a trip means for the engagement of pawl 137 in teeth 138 of drum 134. It will be understood that yoke 139 which supports pawl 137 is receiving a reciprocating motion as hereinbefore explained. When table 150 rotates until pin 165 trips trip-lever 169 which is mounted on the upper portion of sleeve 139' which is mounted on yoke 139, and connected to plunger 146 by pin 170, pawl 137 is thrown so that tooth 141 comes into engagement with the teeth 138 of drum 134. By this means a forward motion is given to drum 134 causing a forward movement in sleeve 130 and roll 126. During the period when sleeve 130 is receiving a forward motion feed roll 126 is also receiving a forward clockwise motion in addition to the usual clockwise motion imparted to roll 126 by the shaft 129. The fastener members are therefore being clamped to the tape with a larger spacing between them than in the standard spacing desired for straight fasteners. By this means I form the outside or concave curve of a stringer shown in Fig. 29.

When table 150 rotates until trip pin 167 passes over trip-lever 171 which is secured to the under side of sleeve 139' mounted on yoke 139 pawl 137 is thrown back into its neutral position and consequently drum 134 ceases to revolve, thus spacing the fastener members on the tape as for straight stringers.

When table 150 continues its clockwise movement until trip pin 168 passes over trip-lever 171, pawl 137 is thrown so that its tooth 142 comes into engagement with teeth 138 of drum 134 causing a reverse movement and consequently a backward movement of sleeve 130, away from sleeve 128, which causes feed roll 126 to be retarded from its ordinary spacing. By this means the fastener members are clamped on the tape at a closer spacing than the standard distance, thus providing for the inside or convex curve of a fastener stringer, as shown in Fig. 29.

When trip pin 166 comes into engagement with trip-lever 169 pawl 137 is again thrown into neutral position and thereupon standard spacing of fastener members on the tape once more occurs.

By reference to Fig. 27 it will be seen that trip pins 165 and 168 which throw pawl 137 from neutral into operative position are longer than trip pins 166 and 167 which throw pawl 137 from operative into neutral position.

In order to provide for predetermined lengths of straight portions of stringers, thus altering the relative position of the curved portions with relation to the straight portions of stringers, I provide the trip means 165, 166, 167 and 168 which are mounted in circular slots 172 and 173 of T-shaped cross-section on the upper and lower surfaces respectively of table 150. The trip means are adapted to engage in the T-shaped slots 172 and 173 so that they may be tightly secured therein at predetermined positions, but capable of having these positions altered. It will therefore be seen that the spacing of trip means 165, 166, 167 and 168 will determine in advance the relative position of the curves on the fastener stringers and the lengths of the straight portions of the stringers shown in Fig. 29.

In order to provide for fastener stringers of varying lengths I provide trip mechanism whereby table 150 may receive a swift revoluble movement rather than its step-by-step movement through the actions of pawls 155 and 162, which trip movement is synchronized to accord with the trip movement of the tape over roll 126. When table 150 is thus tripped it travels to a predetermined position where the attaching of the fastener members 54 to tape 80 once more commences for the making of a new stringer. It is to be understood that table 150 is theoretically divided into two semi-circles of which the semi-circle carrying trip pins 165 and 167 accomplishes the purpose of making straight portions and outside curve portions of a fastener stringer. The semi-circle of table 150 which carries trip pins 166 and 168 accomplishes the purpose of forming straight portions and inside curve portions of a fastener stringer.

In order to accomplish the tripping of table 150 to synchronize with the spacing between stringers, I provide a trip connection between the main spacing means and table 150. To accomplish this, a wire or other suitable connection 174 is attached at one end to the trip lever 218 of the tripping mechanism for spacing straight stringers. The wire 174 is attached at its opposite end to trip swivel 175 on which is mounted trip-shoe 176 which is pivoted at 177 and held in position by spring 178. Upon swivel lever 175 being tripped, trip-shoe 176 comes into engagement with lever 179 which is pivoted at 180 to bracket 151. Lever 179 is provided with notch 181. 182 is a pawl pivoted at 183 to bracket 151 and provided with two teeth, an upper and lower, 184 and 185, respectively. Tension spring 186 is provided for the purpose of holding pawl 182 in position with respect to lever 179. I also provide tension spring 187 to retain lever 179 in normal position. When trip swivel 175 is swung by the action of wire 174, trip shoe 176 strikes against lever 179 thereby causing it to move until notch 181 is in engagement with tooth 184 of pawl 182, which holds lever 179 in an open position. Pawl 162 is brought into engagement with tooth 185 of pawl 182 by the action of cam section 163 as it revolves, contacting with pin 188 on pawl 162. By this means pawl 162 is held out of engagement with ratchet 154. It will be understood that I provide a similar trip mechanism for the purpose of operating upon pawl 155, which said pawl 155 is held out of engagement with ratchet 154 when cam section 163 has completed 180° of its revolution, after striking pin 188 of pawl 162.

When pawls 155 and 162 are thus held out of engagement with ratchet 154, ratchet 154 is free to move by the action of friction clutch 156, thereby permitting free rotatable movement of table 150. In order to bring pawls 155 and 162 once more into engagement with ratchet 154 in order once more to commence the step-wise operation of table 150 with respect to the attaching of fastener members to the stringers, I provide two pins 189 and 190 mounted on the upper surface of the ratchet 154. Pawl 182 carries an extension member 191. When ratchet 154 rotates pin 189 will strike extension 191 thereby causing pawl 182 to disengage from pawl 162 and lever 179, thereby letting pawl 162 assume its normal position in engagement with ratchet 154. At the same time pin 190 strikes the corresponding extension 192 permitting pawl 155 to likewise come into engagement with ratchet 154.

In order to retain trip swivel 175 in normal position after being swung by connecting wire 174, I provide a tension spring 193 attached to bracket 151 and trip swivel 175.

If it is desired to change the radius of the curved portion of stringers, this may be accomplished by altering the pitch of the helix in slots 132 and projections 131.

The invention claimed is:

1. In a machine for making fastener stringers of the class described, the combination with a rotatable column having a plurality of dies, of means for revolving said column, means for feeding blanks to said dies, and means to form a blank in one of said dies, means to hold a blank in another of said dies while performing another operation on the member, and common operating means for said blank forming and blank holding means.

2. In a machine for making fastener stringers of the class described, the combination with a rotatable column having a plurality of dies, of means for revolving said column intermittently, means for feeding blanks to said dies, and means operated between each movement of said column to form a blank in one of said dies, means to hold a blank in another of said dies while performing another operation on the member, and common operating means for said blank forming and blank holding means.

3. In the machine for making fastener stringers of the class described, the combination with a rotatable column having a plurality of dies, of means for revolving said column, means for feeding blanks to said dies, means for forming a portion of said blanks at one point in the revolution of said column, means adapted to engage the formed portion of said blanks at another point in the revolution of said column for holding said blank while another operation is performed on the same, and common operating means for said blank forming and blank holding means.

4. In a machine for making fastener stringers of the class described, the combination with a rotatable column having a plurality of dies, of means for revolving said column intermittently, means for feeding blanks to said dies, a punch operated intermittently to form said blanks at one point in the revolution of said column, and means acting in consonance with said punch to hold the blanks in said dies by exerting pressure on the same at another point in the revolution of said column while a further operation is being performed on said blanks.

5. In a machine for making fastener stringers of the class described, the combination with a rotatable column having a plurality of dies, of means for revolving said column intermittently, means for feeding blanks to said dies, a forming punch operated intermittently to form said blanks at one point in the revolution of said column, and a second punch operated intermittently to hold said blanks in said dies at another point in the revolution of said column.

6. In a machine for making fastener stringers of the class described, the combination with a rotatable column having a plurality of dies, of means for revolving said column intermittently, means for feeding blanks to said dies, means for forming said blanks at one point in the revolution of said column, means for attaching the formed blanks to a holding strip at another point in the revolution of said column, and means operated simultaneously with said forming means for holding the formed blanks in the dies while being attached to said holding strip.

7. In a machine for making fastener stringers of the class described, the combination with a rotatable column having a plurality of dies, of means for revolving said column, means for feeding blanks to said dies, a forming punch in the path of said dies adapted to form said blanks successively, and means diametrically opposite said punch adapted to successively press upon the blanks to hold them in the dies while performing another operation thereon.

8. In a machine for making fastener stringers of the class described, the combination with a rotatable column having a plurality of dies, of means for revolving said column intermittently, means for feeding blanks to said dies, a punch operated intermittently to form the blanks in said dies, means diametrically opposite the point where said blanks are formed for attaching said blanks to a holding strip, and a punch adapted to press upon the blanks to hold them in the dies while being attached to said holding strip.

9. In a machine for making fastener stringers of the class described, the combination with a rotatable column having a plurality of dies, of means for revolving said column, means for feeding blanks to said dies, a punch in the path of said dies having a projection adapted to form an engageable portion on each of said blanks, and a second punch having a projection similar to that of the first-mentioned punch adapted to press upon the engageable portion of said blanks to prevent the blanks from slipping to permit another operation to be performed thereon.

10. In a machine for making fastener stringers of the class described, the combination with a rotatable column having a plurality of dies, of means for revolving said column, means for feeding blanks to said dies, a punch in the path of said dies adapted to form said blanks, a second punch at another point in the path of said dies having a portion adapted to engage a blank to hold it in the die, a shaft having a pair of arms adapted when moved in one direction to operate said punches, and a lever operated intermittently to actuate said shaft and arms to simultaneously form a blank in one die and hold a blank in another die.

11. In a machine for making fastener stringers of the class described, the combination with a rotatable column having a plurality of dies, of means for revolving said column intermittently, means for feeding blanks to said dies, a punch in the path of said dies adapted to form said blanks, a second punch at another point in the path of said dies having a portion adapted to engage a blank to hold it in the die, a shaft having a pair of arms adapted when moved in one direction to exert a thrust upon said punches, a lever operated intermittently to actuate said shaft and arms to simultaneously form a blank in one die and hold a blank in another die, and springs adapted to raise said punches after each operation of said lever.

12. In a machine for making fastener stringers of the class described, the combination with a rotatable column having a plurality of dies, of means for revolving said column, means for feeding blanks to said dies, means for forming an engageable portion on each of said blanks, a tension punch in the path of said dies adapted to press upon said blanks to hold them in said dies, and an adjustable portion on said punch having a part fitting into the engageable portion of said blanks to prevent slipping.

13. In a machine for making fastener stringers of the class described, the combination with a die adapted to receive blanks, of a bearing, a punch reciprocating therein and cooperating with said die to form said blanks, a wedge-shaped member abutting against said bearing, and means for adjusting said wedge-shaped member to adjust the position of said bearing and punch.

14. In a machine for making fastener stringers of the class described, the combination with a die adapted to receive blanks, of a bearing, a punch reciprocating therein and co-operating with said die to form said blanks, a bracket spaced from said bearing, a wedge-shaped member abutting against said bearing and said bracket, and means for adjusting said wedge-shaped member to adjust the position of said bearing and punch.

15. In a machine for making fastener stringers of the class described, the combination with a horizontal die adapted to receive blanks, of a vertical bearing containing a slidable punch co-operating with said die to form said blanks, a bracket spaced from said bearing, a wedge-shaped member between and abutting against said bearing and said bracket, and means for moving said wedge-shaped member up and down to adjust said bearing and punch laterally.

16. In a machine for making fastener stringers of the class described, the combination with a die adapted to receive blanks, of a bearing containing a punch co-operating with said die to form said blanks, a bracket, a wedge-shaped key member engaging said bearing and abutting against said bracket, means for adjusting said key member to adjust said bearing and punch laterally, and means for moving said key member transversely to adjust said bearing and punch transversely.

17. In a machine for making fastener stringers of the class described, the combination with a die adapted to receive blanks, of a bearing, a punch reciprocating therein and co-operating with said die to form said blanks, means for adjusting said punch toward and away from said die, a wedge-shaped key member slidably engaging said bearing, means for adjusting said key member to adjust said bearing and punch laterally, and means for moving said key member transversely to adjust said bearing and punch transversely.

18. In a machine for making fastener stringers of the class described, the combination with a die adapted to receive blanks, of a bearing containing a punch co-operating with said die to form said blanks, a key member engaging said bearing, and having an elongated slot, and a second key member adjustable in said slot and adapted when adjusted to move said first-mentioned key member and thereby adjust said bearing and punch.

19. In a machine for making fastener stringers of the class described, the combination with a die adapted to receive blanks, of a bearing containing a punch co-operating with said die to form said blanks, a key member engaging said bearing, and having an elongated slot disposed at an angle to the sides of said member, a second key member having an angled portion overlapping said slot with side edges parallel to the sides of said first-mentioned key member, and means for moving said second key member in said slot to move said first-mentioned key member and thereby adjust said bearing and said punch.

20. In a machine for making fastener stringers of the class described, the combination with a horizontal die adapted to receive blanks, of a vertical bearing containing a slidable punch co-operating with said die to form said blanks, a bracket, a wedge-shaped key member having lateral faces abutting against said bearing and said bracket and having a portion projecting outwardly from its lateral face and riding in said bracket, means for moving said wedge-shaped key member up and down to adjust said bearing and punch laterally, one face of said wedge-shaped key member being provided with a slot disposed at an angle to the vertical sides of said member, a second key member having an angled portion riding in the slot of said first-mentioned key member and a portion overlapping said slot with side edges parallel to the vertical sides of said first-mentioned key member, and means for moving said second key member up and down in said slot to adjust said first-mentioned key member transversely thereby also adjusting said vertical bearing and said punch transversely.

21. In a machine for making fastener stringers of the class described, the combination with a rotatable column having a plurality of dies adapted to receive blanks, of means for revolving said column, a spring plate extending across a portion of said column in the path of said dies, and means for pressing said plate against said blanks to hold them in said dies.

22. In a machine for making fastener stringers of the class described, the combination with a rotatable column having a plurality of dies adapted to receive blanks, of means for revolving said column intermittently, a spring plate extending across a portion of said column in the path of said dies, and means for pressing said plate against said blanks in the interval between movements of said column to hold said blanks in said dies.

23. In a machine for making fastener stringers of the class described, the combination with a rotatable column having a plurality of dies adapted to receive blanks, of means for revolving said column intermittently, means for passing a holding strip in proximity to said column and for attaching said blanks thereto in the interval between movements of said column, a spring plate extending across the path of said dies normally out of contact with the blanks and having a recess to permit the holding strip to pass through, and means for intermittently pressing said plate against said blanks while being attached to said holding strip.

24. In a machine for making fastener stringers of the class described, the combination with a rotating column having a plurality of dies adapted to receive blanks, of means for revolving said column intermittently, a spring plate extending across a portion of said column in the path of said dies and normally out of contact with said blanks, means adjacent said spring plate adapted to operate upon said blanks in the interval between movements of said column, a lever having spaced prongs adapted to ride on said plate, and means for actuating said lever intermittently to force said prongs against said plate and thereby press said plate against said blanks.

25. In a machine for making fastener stringers of the class described, the combination with means for feeding a strip of flexible material, of strip tensioning means comprising a rotatable roll over which said strip is passed, means for pressing said strip in contact with said roll, stationary friction rings on opposite sides of said roll, and adjustable means for pressing said friction rings against said roll to control the rate of rotation of said roll and the resulting tension of said strip of material.

26. In a machine for making fastener stringers of the class described, the combination with means for feeding a strip of flexible material, of strip tensioning means comprising a rotatable roll over which said strip is passed, means for pressing said strip in contact with said roll, stationary friction rings on opposite sides of said roll, a spring pressing said rings into frictional engagements with said roll, and means for adjusting the tension of said spring to vary the frictional drag on said roll and the consequent tension on said strip of material.

27. In a machine for making fastener stringers of the class described, the combination with means for feeding a strip of flexible material, of strip tensioning means comprising a shaft having an idler roll over which said strip is passed, means for pressing said strip in contact with said roll, a stationary friction ring on one side of said roll, a second friction ring slidable on said shaft on the opposite side of said roll and held against rotation on said shaft, a spring acting on said slidable ring to press said rings and roll into frictional engagements and means for adjusting the tension of said spring to vary the frictional drag on said roll and the consequent tension on said strip of material.

28. In a machine for making fastener stringers of the class described, the combination with means for feeding a strip of flexible material, of strip tensioning means comprising an idler roll having a gripping peripheral portion over which said strip is passed, means for pressing said strip in contact with said roll, friction rings held against rotation on opposite sides of said roll, a spring pressing said rings and roll into frictional engagement, and means for adjusting the tension of said spring to vary the frictional drag on said roll and the consequent tension on said strip of material.

29. In a machine for making fastener stringers of the class described, the combination with means for attaching blanks to a strip of material, of means for feeding said strip intermittently to provide uniform spacing of blanks thereon, periodically operated means for moving said strip rapidly to provide gaps between groups of blanks on said strip, means for selectively accelerating or retarding the intermittent feeding of said strip to vary the spacing of blanks thereon, and means operated in synchronism with said periodically operated means for disabling said selective accelerating and retarding means.

30. In a machine for making fastener stringers of the class described, the combination with means for attaching blanks to a strip of material, of a roll for feeding said strip, means for rotating said roll intermittently to provide uniform spacing of blanks on said strip, tripping means for rotating said roll rapidly to provide gaps between groups of blanks on said strip, means for selectively accelerating or retarding the intermittent rotation of said roll to vary the spacing of blanks on said strip, and means operated in synchronism with said tripping means for disabling said selective accelerating and retarding means during the rapid rotation of said roll.

31. In a machine for making fastener stringers of the class described, the combination with means for attaching blanks to a strip of material, of a roll for feeding said strip, means for rotating said roll intermittently to provide uniform spacing of blanks on said strip, means including a clutch for selectively accelerating or retarding the rotation of said roll to vary the spacing of blanks on said strip, means for actuating said clutch, and a rotatable table having a plurality of pins for tripping said actuating means to selectively operate said clutch.

32. In a machine for making fastener stringers of the class described, the combination with means for attaching blanks to a strip of material, of a roll for feeding said strip, means for rotating said roll intermittently to provide uniform spacing of blanks on said strip, means including a clutch movable toward and away from said roll to selectively accelerate or retard rotation thereof to vary the spacing of blanks on said strip, means including a pawl for selectively actuating said clutch in either direction, and a rotatable table having a plurality of pins adapted to trip said pawl into either actuating position and into neutral position.

33. In a machine for making fastener stringers of the class described, the combination with means for attaching blanks to a strip of material, of a roll for feeding said strip, means for rotating said roll intermittently to provide uniform spacing of blanks on said strip, a clutch movable toward and away from said roll to selectively accelerate or retard rotation thereof to vary the spacing of blanks on said strip, a ratchet for actuating said clutch, a pawl for selectively operating said ratchet in either direction to move said clutch toward or away from said roll, a pair of trip levers controlling the position of said pawl, and a rotatable table having a plurality of pins adapted to engage said trip levers to selectively throw said pawl into either operating position and into neutral position.

34. In a machine for making fastener stringers of the class described, the combination with means for attaching blanks to a strip of material, of a roll for feeding said strip, means for rotating said roll intermittently to provide uniform spacing of blanks on said strip, a clutch movable toward and away from said roll to selectively accelerate or retard rotation thereof to vary the spacing of blanks on said strip, means including a pawl for selectively moving said clutch in either direction, trip levers adapted to throw said pawl into either operative position or into neutral position, and a rotatable table having a plurality of elongated trip pins adapted to actuate said levers to throw said pawl into either operative position and a plurality of shorter trip pins adapted to actuate said trip levers to throw said pawl into neutral position.

35. In a machine for making fastener stringers of the class described, the combination with an intermittently driven feed roll, of a driving connection therefor, means including a ratchet for controlling said driving connection to advance or retard the roll relatively to its normal feed, a pawl having teeth for selectively moving said ratchet in either direction, a yoke having a pair of trip levers adapted selectively to throw said pawl into either operative position or into neutral position, a rotatable table mounted between said trip levers, circular slots of T-shaped cross-section on each side of said table adjacent the periphery thereof, and trip pins adjustably mounted in said slots to operate said trip levers.

36. In a machine for making fastener stringers of the class described, the combination with an intermittently driven feed roll, of a driving connection therefor, means including a ratchet for controlling said driving connection to advance or retard the roll relatively to its normal feed, a pawl having teeth for selectively moving said ratchet in either direction, a yoke having a pair of trip levers movable into different positions to throw said pawl into either operative position or into neutral position, a rotatable table mounted between said trip levers, circular slots of T-shaped cross-section on each side of said table adjacent the periphery thereof, an elongated trip pin adjustably mounted in each of said slots to selectively trip said levers into different operative positions, and a shorter trip pin adjustably mounted in each of said slots to trip said levers into neutral position.

37. In a machine for making fasteners, a movable die for receiving a fastener unit blank, a punch arranged to reciprocate in a straight line above said die to form an interlocking recess in said blank, a vertical guide bearing for supporting and guiding said punch, and means for adjusting the relative position of said punch and guide in a plurality of directions horizontally without affecting the operation of said punch.

38. In a machine for making fasteners, a movable die having means for receiving a fastener unit blank, a punch arranged to form an interlocking recess in said blank in one position of said movable die, a spring for retracting said punch from said blank, and actuating means having a loose connection with said punch for moving it toward said punch.

39. In a machine for making fasteners, a movable die having means for receiving a fastener unit blank, a punch arranged for straight line movement above said blank to form an interlocking recess therein in one position of said movable die, a lever having a lost motion connection with said punch for moving it toward said blank, a compression spring for retracting said punch, means for intermittently oscillating said lever, and means for moving said die to carry said blank away from said punch.

40. In a machine for making fasteners, the combination set forth in claim 39 in which said lever is pivoted closer to the end connected to said punch than to the opposite end.

41. In a machine for making fasteners, the combination set forth in claim 39 in which said lever is pivoted adjacent one end, such end of the lever being bifurcated and having a loose connection with said punch.

42. In a machine for making fasteners, a rotatable die carrier, a plurality of dies on said carrier for receiving fastener unit blanks, a punch arranged adjacent said carrier for forming an interlocking recess in each of said blanks in one position of the rotatable die, a guide in which said punch is mounted, punch actuating mechanism having a loose connection therewith for giving said punch a quick blow toward said die, and a compression spring for retracting said punch.

43. In a machine for making fasteners, a die for receiving a fastener unit blank, a punch mounted for straight line movement to form an interlocking recess in said blank, a lever pivoted intermediate its ends having a loose connection with said punch for actuating the same toward said blank, a spring for retracting said punch, a plunger mounted for straight line movement to strike against the opposite end of said lever for actuating the punch, and means including a cam for actuating said plunger.

44. The method of making fasteners of the type having a plurality of interlocking elements spaced along a carrier strip which consists in simultaneously moving a plurality of dies and a carrier strip at intermittent intervals, intermittently feeding blanks to said dies, and simultaneously forming an interlocking portion on a blank in one of said dies and clamping a formed blank on the carrier strip in another of said dies while positively applying pressure to opposite faces of the formed blank to hold it in said last mentioned die.

GIDEON SUNDBACK.